United States Patent
Thomas

(10) Patent No.: US 9,509,129 B2
(45) Date of Patent: Nov. 29, 2016

(54) BRACKET FOR ATTACHING AN ELECTRICAL CABLE TO A VEHICLE

(75) Inventor: Bryan Thomas, Bristol (GB)

(73) Assignee: Airbus Operations Limited, Bristol (GB)

( * ) Notice: Subject to any disclaimer, the term of this patent is extended or adjusted under 35 U.S.C. 154(b) by 901 days.

(21) Appl. No.: 12/929,424

(22) Filed: Jan. 24, 2011

(65) Prior Publication Data

US 2011/0180320 A1 Jul. 28, 2011

(30) Foreign Application Priority Data

Jan. 22, 2010 (GB) .................................. 1001002.3

(51) Int. Cl.
*H02G 3/00* (2006.01)
*F16L 3/08* (2006.01)
*H02G 3/32* (2006.01)
(Continued)

(52) U.S. Cl.
CPC ............. *H02G 3/32* (2013.01); *B60R 16/0215* (2013.01); *B64C 1/406* (2013.01); *Y02T 50/46* (2013.01); *Y10T 29/4995* (2015.01)

(58) Field of Classification Search
CPC .... B60R 16/0215; B64C 1/406; H02G 3/32; Y10T 29/4995; Y02T 50/46
USPC ...................... 174/70 R, 72 A, 135
See application file for complete search history.

(56) References Cited

U.S. PATENT DOCUMENTS 3,250,505 A * 5/1966 Rodman, Sr. et al. .......... 248/49
3,486,725 A * 12/1969 Hidassy ........................ 248/68.1
3,632,071 A * 1/1972 Cameron et al. ............. 248/74.3

(Continued)

FOREIGN PATENT DOCUMENTS

DE 10 2006 033 800 1/2008
DE 10 2006 053 966 5/2008
(Continued)

OTHER PUBLICATIONS

Extended European Search Report dated Mar. 24, 2011 in EP 11151595.3-1254.
(Continued)

*Primary Examiner* — David M Sinclair
*Assistant Examiner* — Theron S Milliser
(74) *Attorney, Agent, or Firm* — Nixon & Vanderhye P.C.

(57) ABSTRACT

The invention provides a bracket 1 for attaching an electrical cable 6 to a vehicle, the bracket comprising a vehicle attachment portion 11, 31 for attaching the bracket to a vehicle attachment surface of the vehicle, and a cable securing portion 13, 33 for securing the cable to the bracket 1, the cable securing portion 13, 33 comprising a cable abutment portion 4, 8 against the front surface of which the cable 6 can be secured by a cable-tie 7 forming a closed loop around the cable 6 and cable abutment portion 4, 8, and a non-planar rear surface which at least partially defines the path of the closed loop of the cable-tie 7 behind the cable abutment portion 4, 8, the path passing a first region on one side of the non-planar rear surface and a second region on the opposite side of the non-planar rear surface, wherein, in use, the non-planar rear surface directly supports the cable-tie 7 at a third region along the path of the closed loop, the third region being positioned, along the path, between the first and second regions. The invention also provides an aircraft fuel tank comprising a plurality of such brackets 1 and an electrical cable 6, secured to each of the brackets with a cable-tie 7.

24 Claims, 13 Drawing Sheets

(51) Int. Cl.
 *B60R 16/02* (2006.01)
 *B64C 1/40* (2006.01)

(56) References Cited

U.S. PATENT DOCUMENTS

| | | | | |
|---|---|---|---|---|
| 3,913,876 | A * | 10/1975 | McSherry | 248/74.3 |
| 3,933,377 | A * | 1/1976 | Arrowood | 285/61 |
| 4,369,944 | A * | 1/1983 | Hobart, Jr. | 248/56 |
| 4,395,009 | A * | 7/1983 | Bormke | 248/68.1 |
| 4,462,141 | A * | 7/1984 | Bogese | 24/16 PB |
| 4,562,982 | A * | 1/1986 | McSherry et al. | 248/61 |
| 4,638,966 | A * | 1/1987 | Ford | 248/62 |
| 4,768,741 | A * | 9/1988 | Logsdon | 248/62 |
| 4,874,908 | A * | 10/1989 | Johansson | 174/72 A |
| 4,925,136 | A * | 5/1990 | Knott | 248/62 |
| 5,042,114 | A * | 8/1991 | Parrish | 24/16 PB |
| 5,730,399 | A * | 3/1998 | Baginski | 248/58 |
| 5,823,484 | A | 10/1998 | Barnard et al. | |
| D401,498 | S * | 11/1998 | Caveney | D8/356 |
| 5,941,483 | A * | 8/1999 | Baginski | 248/68.1 |
| 6,129,317 | A * | 10/2000 | Rodrigues et al. | 248/74.3 |
| 6,190,083 | B1 * | 2/2001 | Winton, III | 403/375 |
| 6,196,751 | B1 * | 3/2001 | Khokhar | 403/3 |
| 6,394,399 | B2 * | 5/2002 | Koziol | 248/74.3 |
| 6,533,226 | B2 * | 3/2003 | Geiger | 248/74.3 |
| 6,669,151 | B2 * | 12/2003 | Mascadri | 248/74.3 |
| 6,981,683 | B2 * | 1/2006 | Winton, III | 248/505 |
| 7,055,784 | B2 * | 6/2006 | Stigler | 248/74.1 |
| 7,059,565 | B2 * | 6/2006 | Scown et al. | 244/117 R |
| 7,083,152 | B2 * | 8/2006 | Carullo et al. | 248/65 |
| 7,134,633 | B2 * | 11/2006 | Logan | 248/74.3 |
| 7,322,548 | B2 * | 1/2008 | Mielke et al. | 248/74.3 |
| D571,643 | S * | 6/2008 | Newman | D8/380 |
| 7,861,981 | B2 * | 1/2011 | Olver | 248/68.1 |
| 8,028,962 | B2 * | 10/2011 | Geiger | 248/74.3 |
| 8,141,826 | B1 * | 3/2012 | Gallardo et al. | 248/74.4 |
| 2005/0082431 | A1 * | 4/2005 | Scown et al. | 244/119 |
| 2005/0257347 | A1 | 11/2005 | Tsuchiya | |
| 2006/0051181 | A1 * | 3/2006 | Winton, III | 411/180 |
| 2006/0169850 | A1 | 8/2006 | Wunderlich et al. | |

FOREIGN PATENT DOCUMENTS

| | | |
|---|---|---|
| EP | 0 054 478 | 6/1982 |
| WO | WO 2008/146417 | 12/2008 |

OTHER PUBLICATIONS

UK Search Report for GB No. 1001002.3, dated May 24, 2010.

* cited by examiner

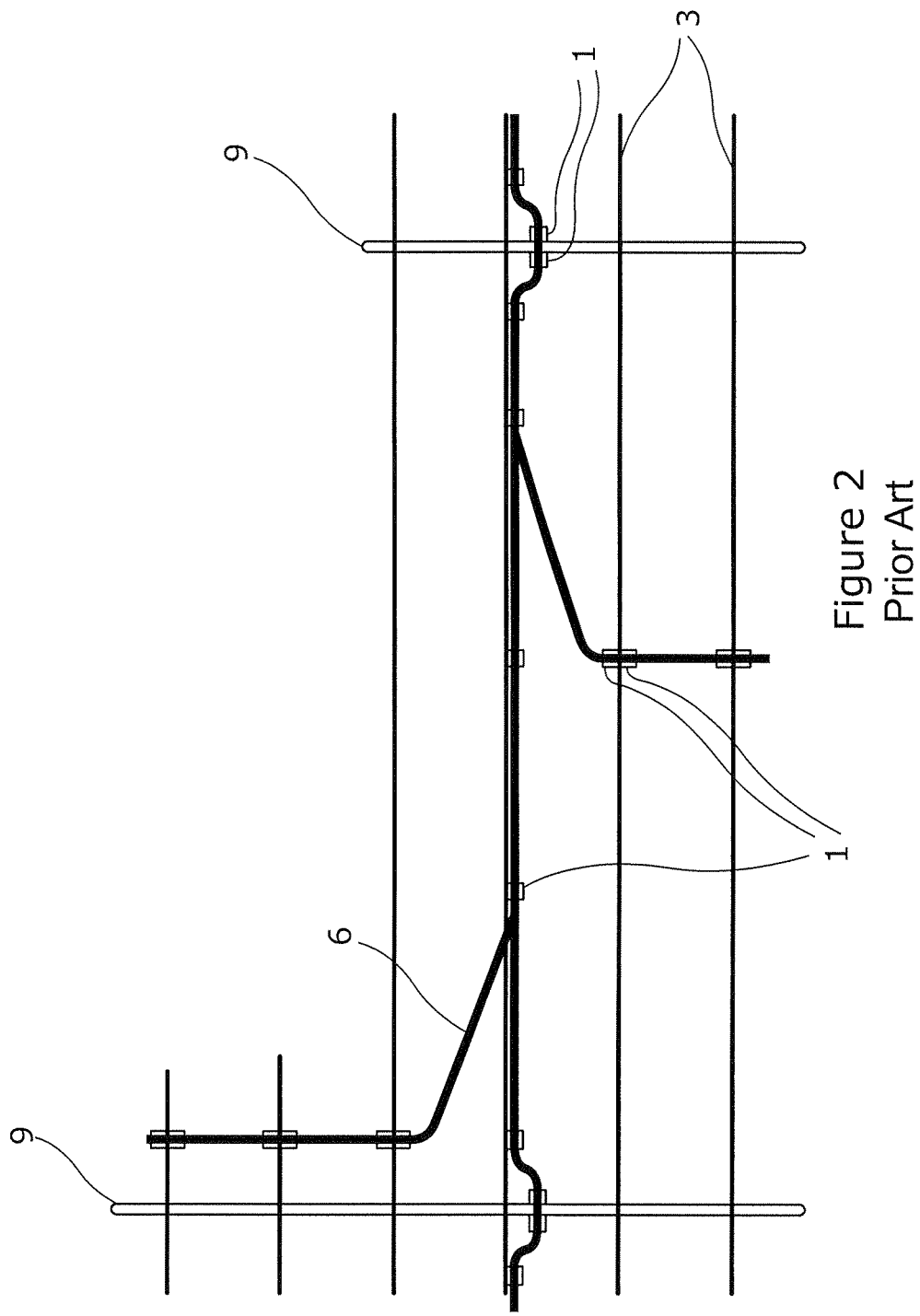

BRACKET FOR ATTACHING AN ELECTRICAL CABLE TO A VEHICLE

This application claims priority to GB Application No. 1001002.3 filed 22 Aug. 2010, the entire contents of which is hereby incorporated by reference.

BACKGROUND OF THE INVENTION

The present invention concerns brackets for attaching an electrical cable to a vehicle. More particularly, but not exclusively, this invention concerns a bracket for attaching to a fuel tank of an aircraft in order to secure an electrical cable. The invention also concerns an electrical assembly comprising a plurality of such brackets, a fuel tank comprising a plurality of such brackets, an aircraft comprising a plurality of such brackets or such an electrical assembly or fuel tank and a method of attaching a cable to a vehicle.

Such brackets are often used to securely hold electrical cable, which is part of a Fuel Quantity Indication (FQI) System of an aircraft. The cable has to be held within the aircraft fuel tank, generally contained within the wing of an aircraft. To comply with the electrical installation requirements, any cable must be maintained at a minimum gap of 10 mm from the fuel tank structure. The cable must have a greater clearance from other systems. It also must remain firmly in position with the minimum possible amount of sag between brackets for the life of the aircraft.

In a metallic fuel tank (for example, made out of aluminium alloy), the brackets are nylon coated aluminium and are attached to stringers and ribs of the fuel tank by drilling and riveting. Two nylon cable-ties are then used at each point of contact along the stringers/ribs to prevent the cable moving.

In a composite wing box, the brackets must be made from a fully insulating material and metal rivets cannot be used to attach the bracket to the fuel tank. Therefore, for composite wings, the brackets used are made from a composite, insulating material, such as PEI (Polyetherimide) or glass fibre re-enforced plastic. The brackets are attached to the fuel tank by adhesive bonding. The nylon cable-ties are tightened using a torque gun (not shown) set at an appropriate torque for the cable-tie being used.

Such a bracket, with the cable and cable-tie in place, is shown in FIGS. 1a and 1b. The bracket 1 has a flat bonding face 2 at one end for attaching to a stringer 3 of the fuel tank. At the opposite end, the bracket has a generally flat and square shaped cable mounting face 4. On each corner of the mounting face 4 is a locating bump 8. These locating bumps 8 provide abutment surfaces for the cable 6 to rest on or against, thereby ensuring the cable rests in a certain position on the bracket 1. On each side of the square face, is a slot 5 for a cable-tie. The cable 6 is secured to the cable mounting face 4 by a cable-tie 7 looped around the cable 6 and cable mounting face 4 through two opposite cable-tie slots 5.

FIG. 2 shows part of a wing box layout, showing the position of the brackets and cable 6, in relation to the stringers 3 and ribs 9 of the fuel tank. The cable 6 is generally run along the length of the stringers 3 and is attached to the stringers at various points with a single bracket 1. These points are approximately 150 to 200 mm apart. The spacing of the points is decided based on maintaining a minimum clearance distance even in the event of a cable-tie/bracket failure, and the resulting "skipping rope" effect of the cable between the brackets either side of the failure being able to swing. When the cable crosses over/under a stringer 3 or a rib 9, two brackets 1 are used, one either side of the stringer/rib.

However, as time passes, the cable becomes loose in the cable-tie and moves about in the bracket. This means the cable can swing in each bracket, decreasing the distance from the cable to the stringers/ribs of the fuel tank.

The present invention seeks to mitigate the above-mentioned problems. Alternatively or additionally, the present invention seeks to provide an improved bracket.

SUMMARY OF THE INVENTION

The present invention provides, according to a first aspect, a bracket for attaching an electrical cable to a vehicle, the bracket comprising a vehicle attachment portion for attaching the bracket to a vehicle attachment surface of the vehicle, and a cable securing portion for securing the cable to the bracket, the cable securing portion comprising a cable abutment portion against the front surface of which the cable can be secured by a cable-tie forming a closed loop around the cable and cable abutment portion, and a non-planar rear surface which at least partially defines the path of the closed loop of the cable-tie behind the cable abutment portion, the path passing a first region on one side of the non-planar rear surface and a second region on the opposite side of the non-planar rear surface, wherein, in use, the non-planar rear surface directly supports the cable-tie at a third region along the path of the closed loop, the third region being positioned, along the path, between the first and second regions.

The applicant has realised that with the prior art brackets, a gap is formed between the cable-tie and the reverse side of the cable abutment portion. Even if a greater torque is applied to tighten the cable-tie, the gap still remains. The gap exists because the cable-tie tends to adopt a degree of curvature around right-angled corners, such that the cable-tie lifts off the reverse side of the cable abutment portion. The gap imparts a slack into the loop of the cable-tie, which over time is distributed around the loop, allowing the cable to move with respect to the bracket.

In addition, the aviation fuel in the fuel tank acts as a lubricant and the over braid coating on the outside of the cable is made from a PEEK™ material, which has a low coefficient of friction. Hence, the cable can become loose very easily.

Providing a non-planar rear surface on the cable securing portion acts to fill the gap, meaning that the cable-tie has less slack in its loop. This allows the cable to be more firmly secured to the bracket by a cable-tie and reduces the relative movement between the bracket and the cable and prevents the cable from moving out of position.

In addition, with a prior art bracket, in the event of a cable-tie/bracket failure, the length of cable between the brackets either side of the failure is increased. This is due to the cable being loose in the bracket. This further adds to the undesirable "skipping rope" effect. This is unlikely to happen in the bracket of the present invention as the cable is much less able to move in the bracket and so the length of cable between the brackets either side of the failure is not increased. Hence, the "skipping rope" effect is limited to the effect produced by the amount of length between the brackets on installation. This increases the possible distance between the brackets and means less brackets have to be installed. This obviously saves time, money and weight.

Preferably, the third region is positioned, along the path, midway between the first and second regions.

Preferably, the non-planar rear surface defines at least three points of contact for the cable-tie on the path behind the cable abutment portion, including (i) a first point of contact at the first region, (ii) a second point of contact at the second region, and (iii) a third point of contact at the third region, wherein the distance of the third point from the cable abutment portion is both greater than the distance of the first point and greater than the distance of the second point from the cable abutment portion. This provides a path for the cable-tie that provides for curvature of the cable-tie.

Preferably, the path provided has a radius of curvature that does not exceed the natural minimum radius of curvature of the cable-tie. The applicant has realised that, in the prior art brackets, the areas of high curvature of the cable-tie at the edges of the rear of the cable mounting face can cause the cable-tie to stretch over time. This reduces the tension on the cable-tie and increases slack in the cable-tie loop. The natural minimum radius of curvature of the cable-tie can therefore be defined as the smallest radius of curvature of the cable-tie at which deformation of the cable-tie does not occur.

Preferably, the cable-tie to be used with the bracket has a width of between 1 mm and 5 mm, preferably between 2 mm and 4 mm, most preferably approximately 3 mm. Preferably, the cable-tie to be used with the bracket has a depth of between 0 and 5 mm, preferably between 1 and 2 mm, most preferably approximately 1.5 mm. Preferably, the cable-tie to be used with the bracket has a length of between 200 and 300 mm most preferably approximately 250 mm. The closed loop formed by the cable-tie preferably has a perimeter of between 3 and 15 mm, preferably between 50 and 100 mm.

Preferably, at least part of the non-planar rear surface has the shape of a cylinder which presents a curved convex profile, thereby defining a substantially curved path in one direction behind the cable abutment portion.

Preferably, the non-planar rear surface defines said at least three points of contact for the cable-tie on the path behind the cable abutment portion in more than one direction behind the cable abutment portion, thereby allowing the cable to be secured to the bracket in a plurality of directions with respect to the vehicle.

Preferably, the non-planar rear surface defines said at least three points of contact for the cable-tie on the path behind the cable abutment portion in more two transverse directions behind the cable abutment portion, thereby allowing the cable to be secured to the bracket in two directions transverse to each other.

Preferably, at least part of the non-planar rear surface has a profile substantially in the form of a dome.

Preferably, the dome is a substantially hemispherical dome.

Preferably, the vehicle attachment portion and the front of the cable abutment portion are offset from each other so that, in use, the bracket can extend over a step on a bracket attachment portion of the vehicle. Preferably, the offset is between 2 mm and 10 mm, preferably between 4 and 8 mm, most preferably approximately 6 mm.

Preferably, no part of the vehicle attachment portion is in line with the front of the cable abutment portion in a direction extending away from the surface of the vehicle attachment portion. In other words, the whole of the vehicle attachment portion is out of line of the front of the cable abutment portion, in a direction extending away from the surface of the vehicle attachment portion. This means that, in use, the cable can be secured to the front of the cable abutment portion in line with a part of the vehicle that cannot be used for attaching the bracket. For example, the vehicle attachment portion of the bracket can be attached to a smooth part of the vehicle surface, whereas the cable can be attached to the front of the cable abutment portion in line with a non-smooth part of the vehicle surface.

Preferably, a vehicle attachment surface of the vehicle attachment portion and the cable abutment portion are substantially perpendicular to each other. This allows the cable to be run offset from a bracket attachment point on the vehicle.

Preferably, the bracket also comprises an arm portion connecting the vehicle attachment portion and cable securing portion, the arm portion having a length such that the cable can be attached at a clearance distance from a bracket attachment surface of the vehicle.

Preferably, the bracket also comprises one or more guiding elements on or adjacent the cable abutment portion for guiding the cable into position on the cable abutment portion. Preferably, the guiding element(s) are in the form of locating bumps extending outwards on the front of the cable abutment portion.

Preferably, the bracket is wholly made from an electrically insulating material. Preferably, the material is PEI (Polyetherimide) or glass fibre re-enforce plastic.

Preferably, the brackets are approximately 1 to 2 inches (25 to 50 mm) long. Preferably, the path of the cable-tie over the non-planar rear surface has a radius of 7 to 10 mm, but preferably, could be as large as 20 mm. Preferably, the cable radius is 1 to 20 mm or larger. Preferably, the non-planar rear surface is designed to provide a curvature on the cable-tie substantially the same as the cable radius.

Preferably the bracket is for use on an aircraft. Preferably, the bracket is for attaching to a fuel tank of the vehicle. Most preferably, the bracket is for use in attaching an electrical cable of a Fuel Quantity Indication (FQI) System to an inside of an aircraft fuel tank. Preferably, the bracket is for use in a composite wing box and is designed to be attached to the aircraft by bonding.

The invention also provides an electrical assembly comprising a plurality of brackets as described above and a cable secured to each of the brackets by a cable-tie.

The invention also provides a stringer or rib with a plurality of brackets as described above, or an electrical assembly as described above mounted thereon.

The invention also provides a fuel tank comprising a plurality of brackets as described above or an electrical assembly as described above or a stringer or rib as described above.

The invention also provides an aircraft comprising a plurality of brackets as described above or an electrical assembly as described above or a stringer or rib as described above or a fuel tank as described above.

According to a second aspect of the invention there is also provided a method of attaching a cable to a vehicle comprising the following steps providing a bracket as described above, attaching the vehicle attachment portion of the bracket to the vehicle, placing the cable on or near the front of the cable abutment portion of the bracket, and tightening a cable-tie around the cable and cable abutment portion so as to secure the cable against the cable abutment portion of the bracket.

Preferably, when the cable-tie is tightened, the cable-tie forms a closed loop and is held in direct contact against the third region of the non-planar rear surface.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 1b shows a side view of the stringer, bracket, cable and cable-tie of FIG. 1a;

FIG. 2 shows a plan view of a typical routing of FQI cables inside a wing box;

FIG. 3b shows a front view of the stringer, bracket, cable and cable-tie of FIG. 3a;

FIG. 4b shows a front view of the bracket of FIG. 4a;

FIG. 4c shows a side view of the bracket of FIG. 4a;

FIG. 4d shows a top view of the bracket of FIG. 4a;

FIG. 5b shows a front view of the stringer, bracket, able and cable-tie of FIG. 5a;

FIG. 7b shows a front view of the rib, two brackets, cable and cable-ties of FIG. 7a.

DETAILED DESCRIPTION

Figure 3A:
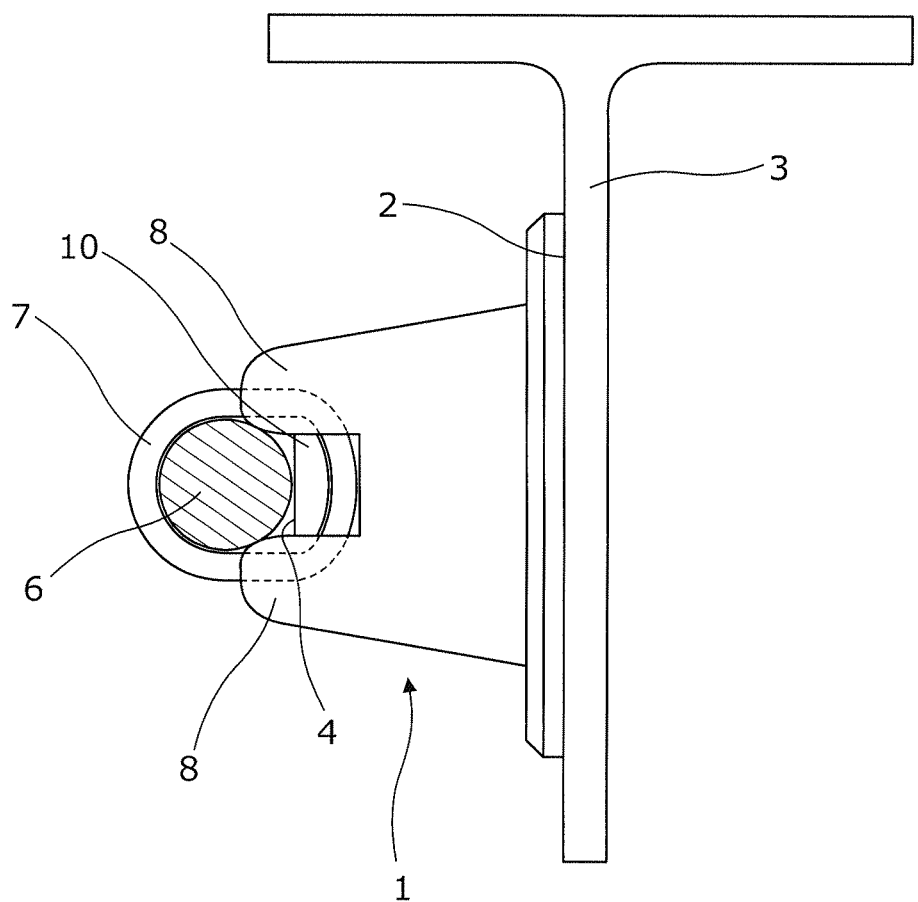
FIG. 3a shows a side view of a bracket according to a first embodiment of the invention, attached to the inside of a stringer, with a cable and cable-tie.
Figure 3B:
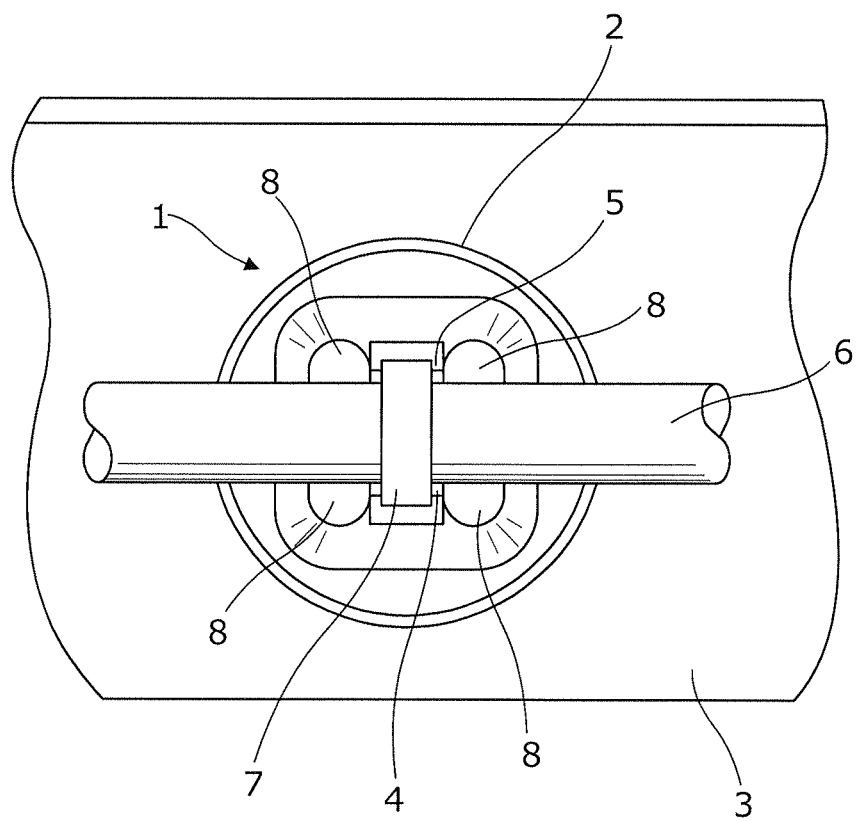
Figure 4A:
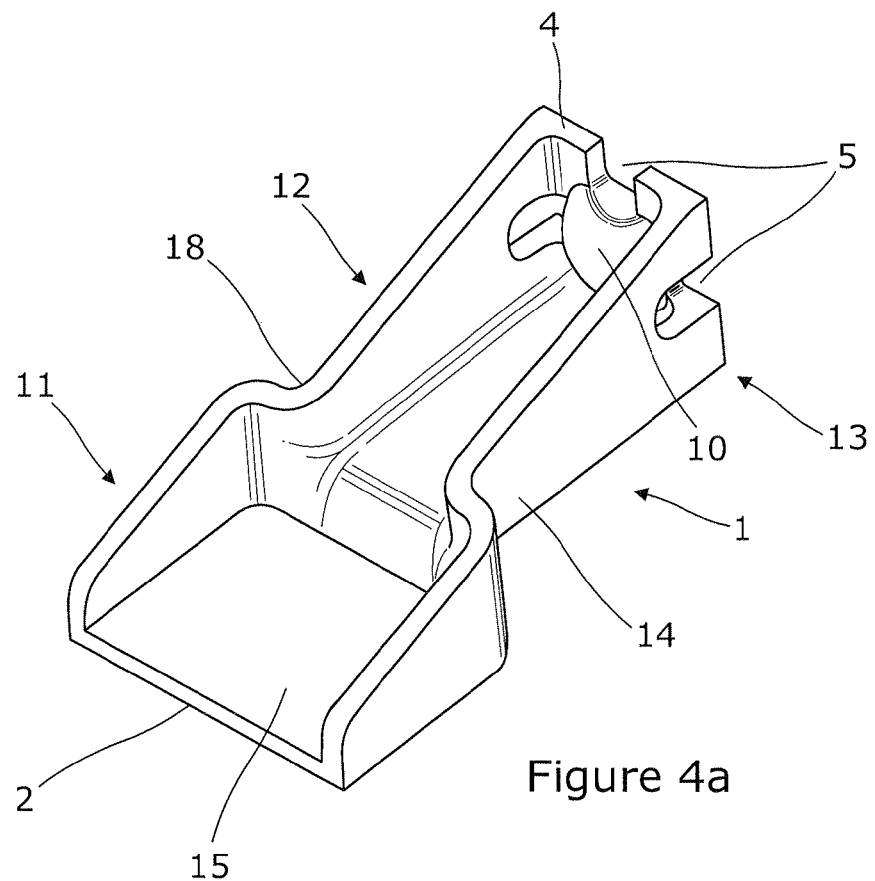
FIG. 4a shows an isometric view of a bracket according to a second embodiment of the invention.
Figure 4B:
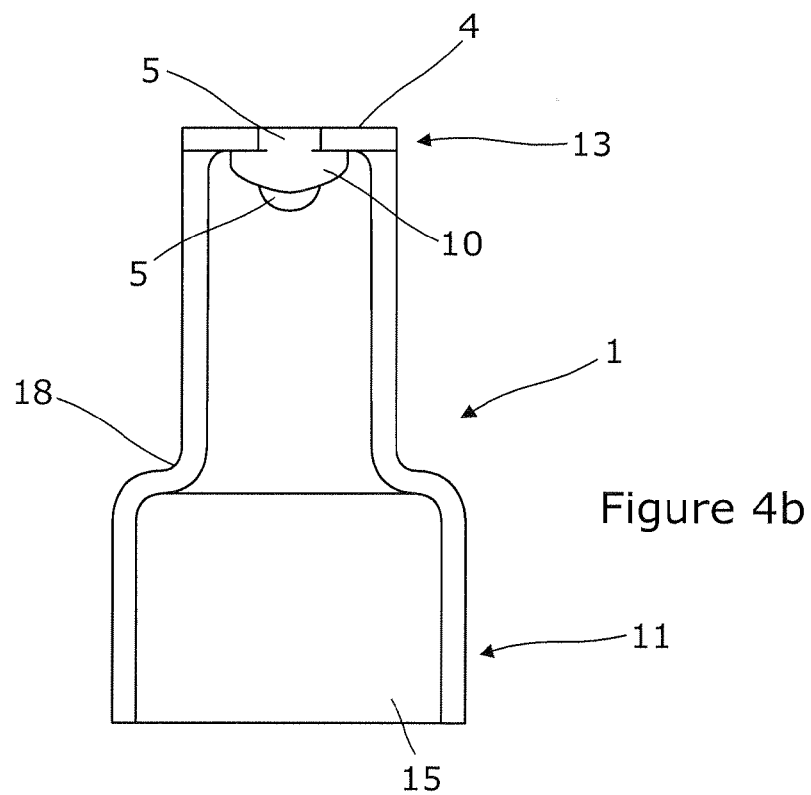
Figure 4C:
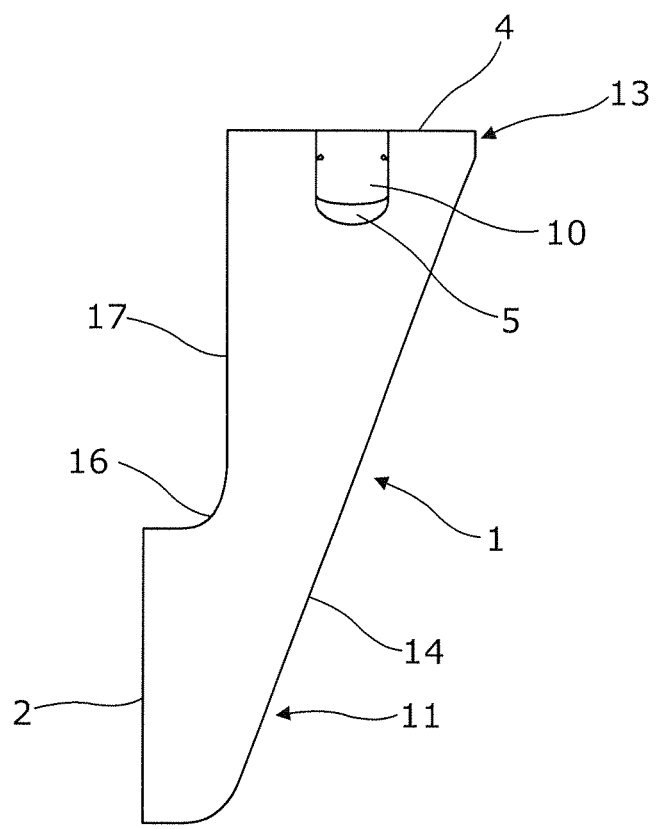
Figure 4D:
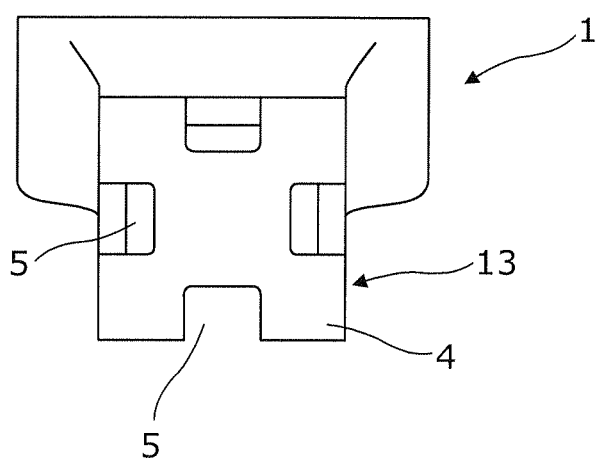

FIGS. 3a and 3b show a bracket 1 according to a first embodiment of the invention. It is similar to the prior art bracket of FIGS. 1a and 1b. The bracket 1 has a flat bonding face 2 at one end for attaching to a stringer 3 of the fuel tank. At the opposite end, the bracket has a generally square shaped cable mounting face 4. On each corner of the mounting face 4 is a locating bump 8. These locating bumps 8 provide abutment surfaces for the cable 6 to rest on or against, thereby ensuring the cable rests in a certain position on the bracket 1. On each side of the square face is a slot 5 for a cable-tie. The cable 6 is secured to the cable mounting face 4 by a cable-tie 7 looped around the cable 6 and cable mounting face 4 through two opposite cable-tie slots 5.

Figure 1A:
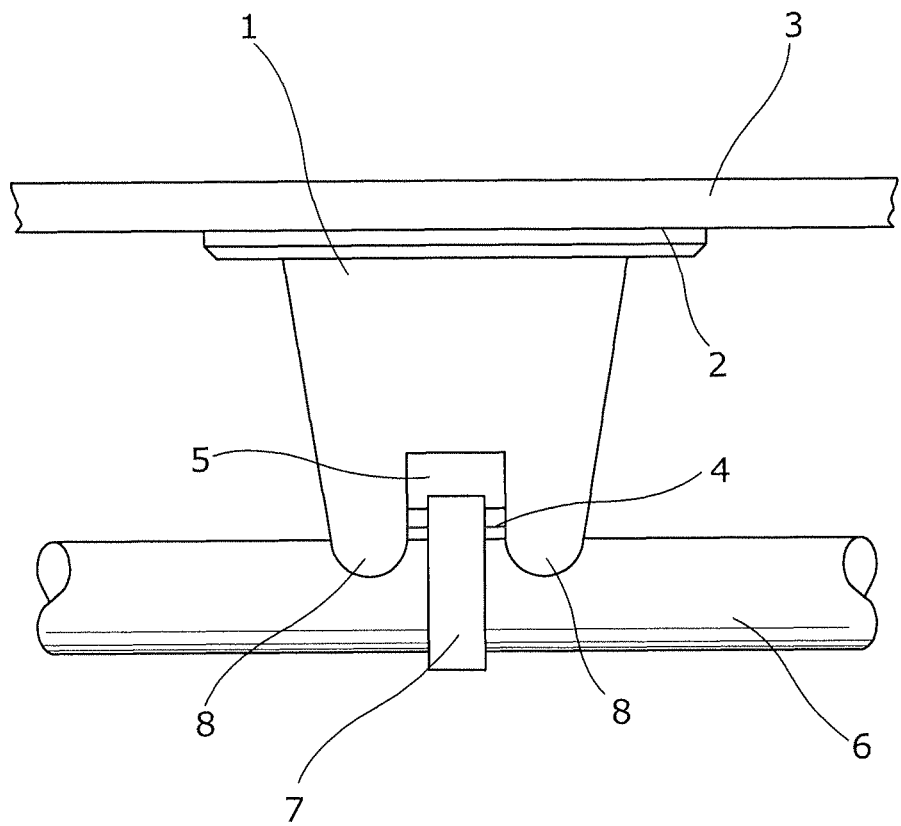
FIG. 1a shows a top view of a prior art bracket, attached to a stringer, with a cable and cable-tie.
Figure 1B:
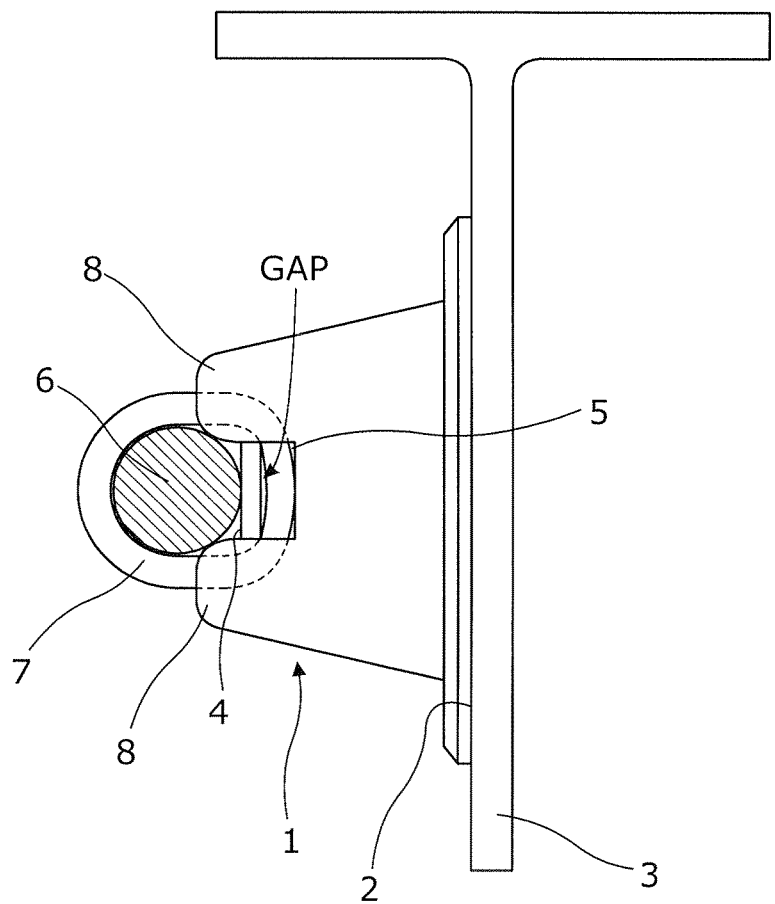

However, an important difference between the bracket of FIGS. 3a and 3b and the bracket of FIGS. 1a and 1b is that the bracket of FIGS. 3a and 3b also comprises a nodule 10 on the back of the cable mounting face 4. The nodule is in the shape of a dome sat on a thin flat substantially circular disc. The dome of the nodule 10 has a radius of curvature of 14 mm and the disc has a radius to match the base radius of the dome. Effectively, this means the nodule has straight sides near its base but a domed top.

When the cable 6 is secured to the cable mounting face 4, the cable-tie 7 is looped around the cable 6, cable mounting face 4 and nodule 10 and then tightened. Hence, the cable-tie 7 forms a loop around the cable 6 and nodule 10. The loop formed is smooth with a relatively large radius of curvature (i.e. not tightly curved) for the entire loop. The bracket of FIGS. 3a and 3b is used to attach a cable 6 along the inside of a stringer 3. The cable-tie 7 has a width of 3 mm, a depth of 1 mm and an original length of 200 to 300 mm. The closed loop formed by the cable-tie has a perimeter of 80 mm. The cable-tie loop is formed in the normal manner. The excess cable-tie length not forming part of the closed loop can be cut off.

FIGS. 4a to 4d show a bracket 1 according to a second embodiment of the invention. The bracket 1 is of a different shape to the bracket of FIGS. 3a and 3b.

The bracket 1 has a head portion 11 at one end of the bracket and an arm portion 12 extending from the head portion 11 to an end portion 13 at the other end of the bracket 1.

The head portion 11 comprises a flat bonding face 2 for attaching to a stringer 3 of the fuel tank using adhesive. The bonding face 2 has a thickness of 2 mm and is in the form of a round-cornered rectangle. The dimensions of the rectangle are 20 by 30 mm. On the other side of the face 2, on the short edges of the rectangle of the head portion 11, two sloping walls 14 extend upwards. The walls 14 have a thickness of 2 mm. The walls 14 are sloped such that their height from the face 2 increases as they move away, from the head portion end of the bracket 1.

At the end of the rectangle of the mounting face 2 nearest the arm portion 12, the sloping walls 14 curve round the corners of the rectangle and then continue extending away from the head portion 11 end of the bracket 1, to form a neck portion 18 at the other end of the head portion 11. This creates a hollow-shaped "scoop" 15 on the head portion 11.

Also at this end of the rectangular mounting face 2, an indent step 16 is formed so as to effectively raise the height of the face 2. This stepped face 17 continues away from the head portion 11 and effectively shortens the height of the sloping walls 14. The face 17 and sloping walls 14 extend away from the head portion 11 to form an arm portion 12. The arm portion 12 is in the form of a channel.

At the far end of the arm portion, the bracket has a generally square shaped cable mounting face 4 facing outwards, away from the bracket 1, to effectively close off the channel of the arm portion 12. The cable mounting face 4 has a thickness of 2 mm and is at 90 degrees to the angle of the flat bonding face 2. The cable mounting face is an 18 mm by 18 mm square shape.

At the middle of each side of the square face 4, is a slot 5 for a cable-tie. On the three sides of the face 4 adjacent the stepped face 17 or the two sloping walls 14, the slot also extends slightly down the arm portion 12 on the face 17 and walls 14 so as to form corner cut-outs. The slots extend 7 mm in length down each wall 14 and face 17 and extend 4 mm into each side of the cable mounting face 4. The slots 5 each have a width of 5.2 mm.

In between the slots, on the rear side of the cable mounting face 4, is a nodule 10. The nodule 10 is similar to the nodule 10 of FIGS. 3a and 3b.

The bracket 1 has an overall length of 52 mm.

Figure 5A:
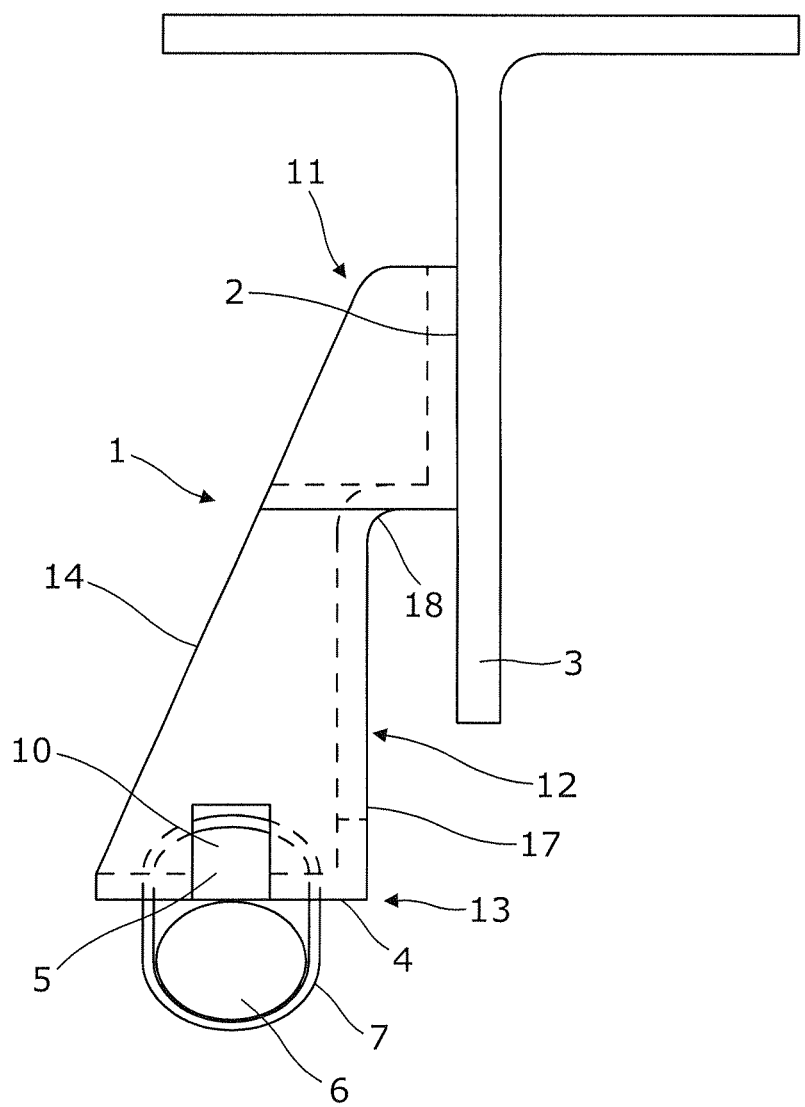
FIG. 5a shows a side view of the bracket of FIG. 4a, attached to a stringer, with a cable and cable-tie.
Figure 5B:
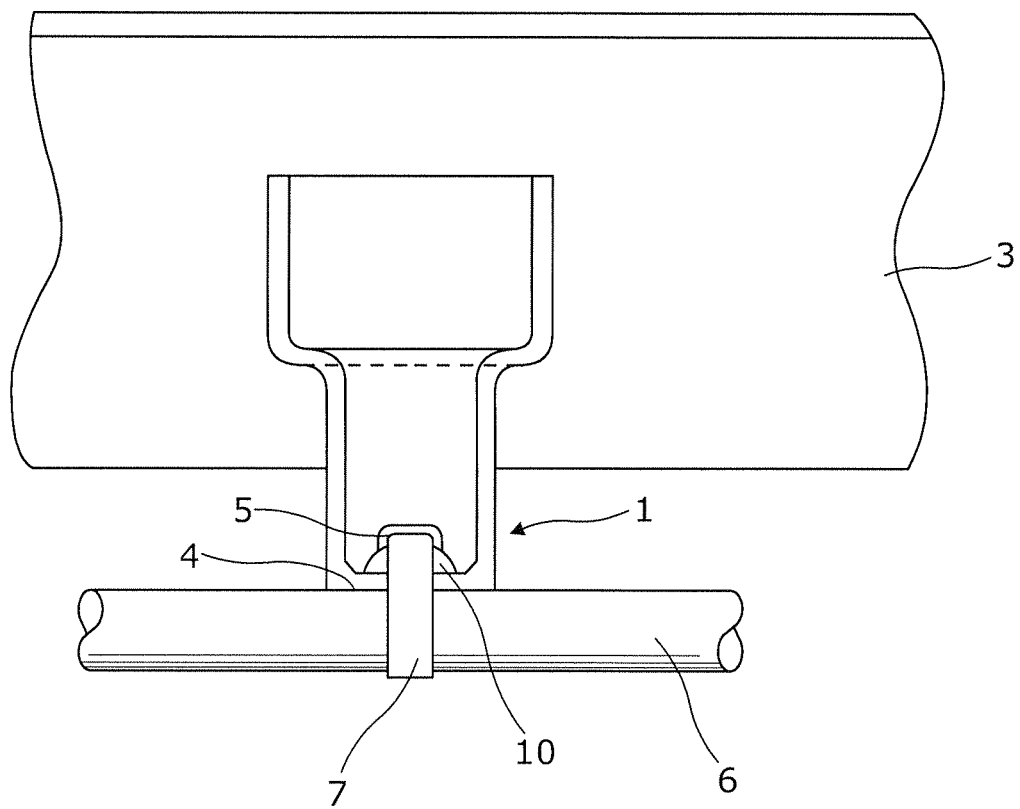

As can be seen in FIGS. 5a and 5b, when the cable 6 is secured to the cable mounting face 4, the cable-tie 7 is looped around the cable 6, cable mounting face 4 and nodule 10 through two opposite cable-tie slots 5 and then tightened. Hence, the cable-tie 7 forms a loop around the cable 6 and nodule 10. The loop formed is smooth with a relatively low radius of curvature for the entire loop. In the embodiment shown in FIGS. 5a and 5b, the cable 6 is run parallel along the underneath of the stringer 3. The axis of the cable 6 is parallel to the stringer length and the cable 6 extends across the cable mounting face 4 from one side of the bracket to the other, i.e. parallel to the long sides of the rectangular face 2.

Figure 6:
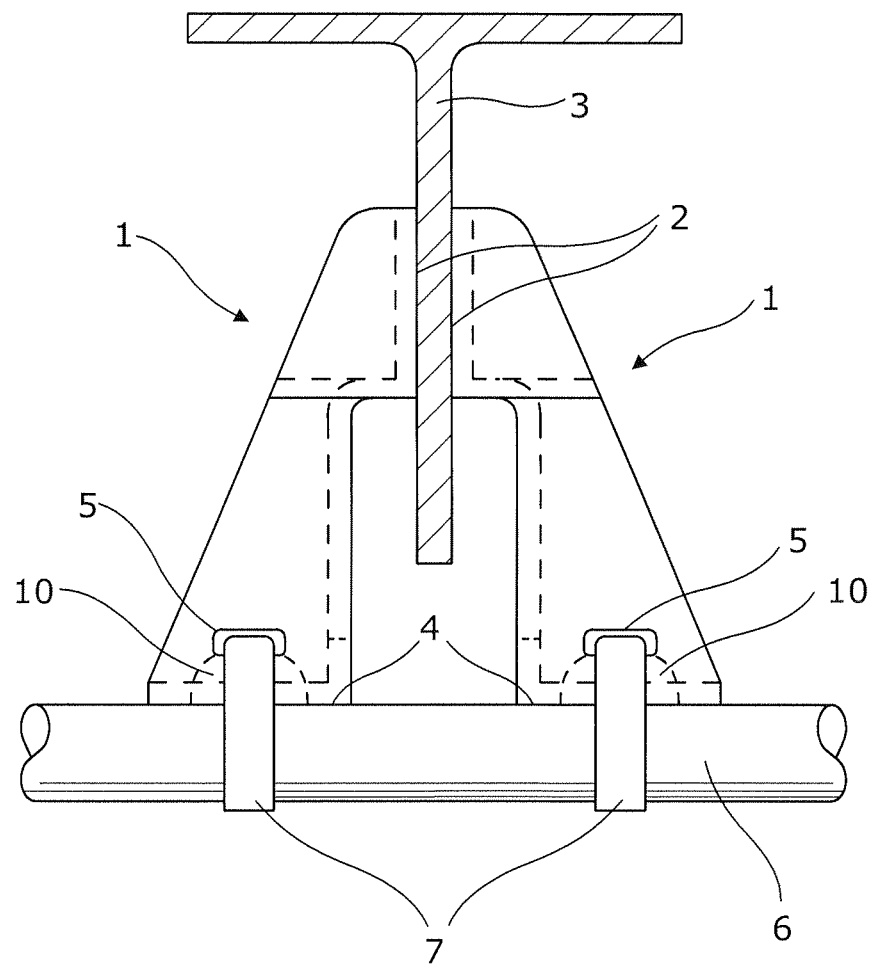
FIG. 6 shows a side view of two brackets of FIG. 4a, attached either side of a stringer, with a cable and cable-ties.

Alternatively, the cable 6 can be run under, substantially perpendicular to the stringer 3. Such a configuration is shown in FIG. 6. One bracket 1 is mounted on the left hand side of the stringer with the flat bonding face 2 facing right and a second bracket 1 is mounted on the right hand side of the stringer with the flat bonding face 2 facing left. Hence, the two flat bonding faces 2 face each other. The brackets 1 are orientated so the end portions 13 of the brackets 1 are lowermost and hang down below the stringer 3.

The cable 6 is mounted to the cable mounting faces 4 of each bracket 1 so as to run underneath the stringer 3. Two brackets 1 are used so that, in the event of one of them failing, the cable 6 is still kept the required distance away from the stringer 3. Here, the axis of the cable 6 crosses under the stringer 3 and the cable 6 extends across the cable mounting faces 4 from the tops to the bottoms of the two brackets 1, i.e. perpendicular to the plane of the rectangular face 2.

Hence; the cable axis of FIGS. 5a and 5b is perpendicular to the cable axis of FIG. 6. The brackets 1 have four cable-tie slots 5 to allow either axis to be chosen.

Figure 7A:
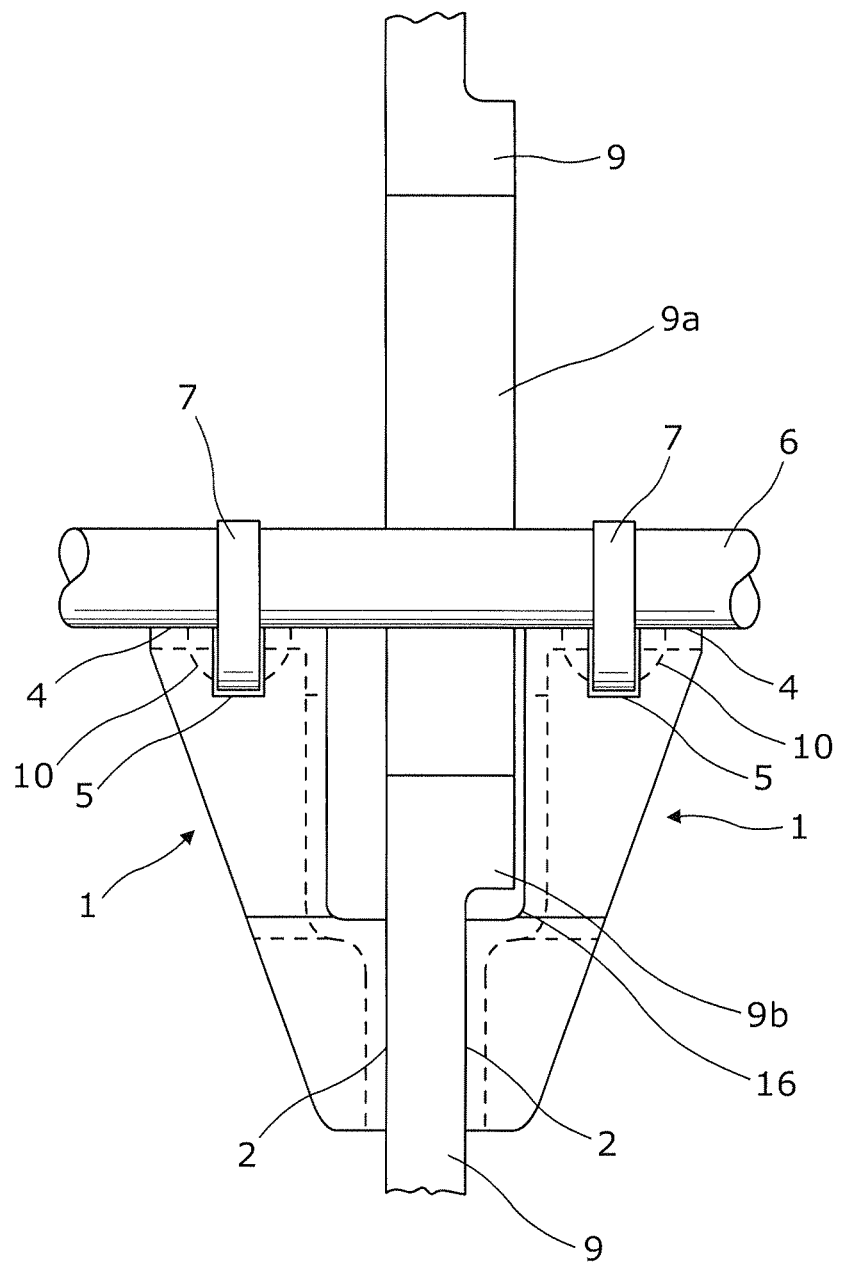
FIG. 7a shows a side view of two brackets of FIG. 4a, attached either side of a rib, with a cable and cable-ties.
Figure 7B:
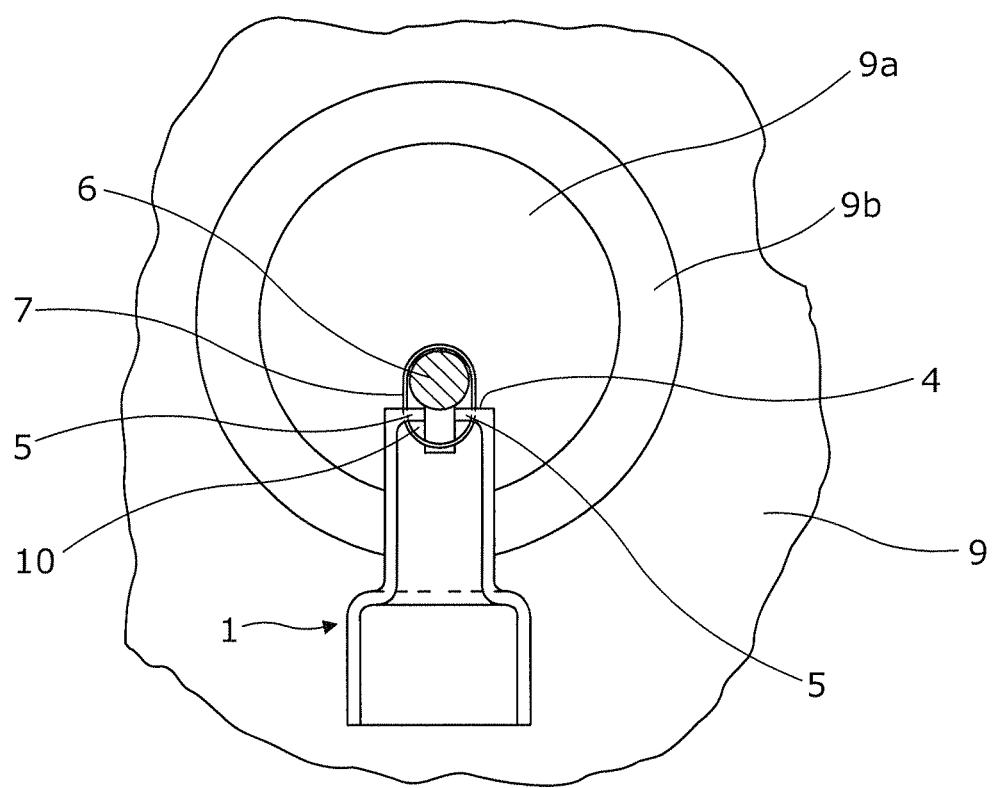

Alternatively, as shown in FIGS. 7a and 7b, the cable 6 can be run through a hole 9a in a rib 9. One bracket 1 is mounted on the left hand side of the rib 9, below the hole 9a with the flat bonding face 2 facing right and a second bracket 1 is mounted on the right hand side of the rib, below, the hole 9a with the flat bonding face 2 facing left. Hence, the two flat bonding faces 2 face each other. The brackets 1 are orientated so the end portions 13 of the brackets 1 are uppermost, either side of the hole 9a.

The cable 6 is mounted to the cable mounting faces 4 of each bracket 1 so as to run through the hole 9a. Two brackets 1 are used so that, in the event of one of them failing, the cable 6 is still kept the required distance away from the rib 9. Here, the axis of the cable 6 crosses through the rib 9 and the cable 6 extends across the cable mounting faces 4 from the tops to the bottoms of the two brackets 1, i.e. perpendicular to the plane of the rectangular face 2.

Hence, the cable axis of FIGS. 7a and 7b, in relation to the brackets, is the same as the cable axis of FIG. 6.

The rib 9 has a raised portion, in the form of an annular boss 9b surrounding the hole 9a. It can be seen in FIG. 7a that the indent step 16, and the fact that face 17 is raised in relation to face 2, allows the arm portion 12 of the bracket 1 to pass over the annular boss 9b of the rib 9.

In use, the flat bonding faces 2 of the brackets 1 are attached to the surface of a stringer 3 or rib 9 of the fuel tank of an aircraft, using adhesive. Once all the relevant brackets 1 are attached, the cable 6 is placed adjacent each bracket 1. A cable-tie 7 is then looped around the cable 6, cable mounting face 4 and nodule 10, and tightened to a set torque by a torque gun.

Figure 8:
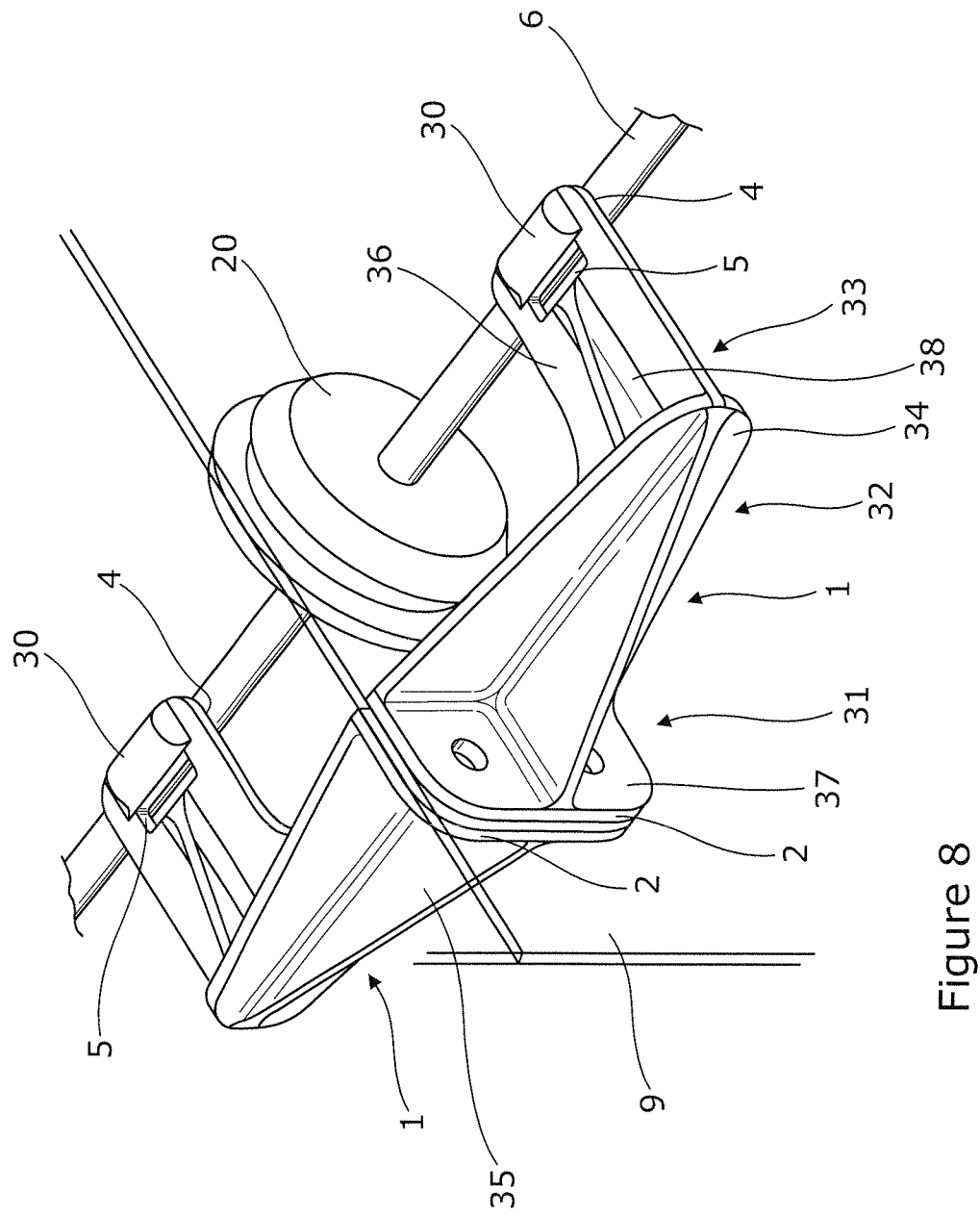
FIG. 8 shows an isometric view of two brackets according to a third embodiment of the invention, attached either side of a rib, with a cable and a grommet, with the cable-ties omitted for clarity.

FIG. 8 shows two brackets 1 according to a third embodiment of the invention. The brackets 1 of FIG. 8 are of a different shape to the brackets of FIGS. 3a and 3b or FIGS. 4a to 7b.

Each bracket 1 of FIG. 8 has a head portion 31 at one end of the bracket and an arm portion 32 extending from the head portion 11 to an end portion 33 at the other end of the bracket 1.

The head portion 31 comprises a flat bonding face 2 for attaching to a stringer 3 of the fuel tank. The bonding face 2 has the form of a rounded rectangle. On the other side of the face 2, a rounded triangular-shaped arm 34 extends out from the bonding face 2. The rounded triangle is symmetrical and has its short side connected to a long edge of the rectangle of face 2. The two long sides of the triangle 34 form the outline of the arm portion 32.

Extending between the triangular arm 34 and the reverse of the bonding face 2 is a right-angled triangle-shaped flange 35. The shortest side of the triangle flange 35 is connected along the width across the middle of the reverse side of the bonding face 2. The middle-length side is connected along the middle of the length of the triangular arm 34. The hypotenuse of the flange 35 extends from one side of the reverse of the bonding face 2 to the apex of the triangular arm 34.

At the far end of the arm portion, towards the apex of triangular arm 34, the bracket has a generally rectangular end portion 33. The end portion 33 is connected by one of the short sides of the rectangle 33 to the triangular arm 34, on the opposite side to the arm flange 35. The short side extends in the direction of the length of the triangular arm 34.

Extending between the opposite side of the triangular arm 34 to the flange 35 and the rectangular end portion 33 is a right-angled triangle-shaped flange 38. The shortest side of the triangle flange 38 is connected to the triangular arm 34. The middle-length side is connected to the arm portion 33, extending from its connection to the triangular arm 34 to a point about three quarters of the length along the end portion 33. The hypotenuse of the flange 38 extends from the triangular arm 34 to the rectangular end portion 33.

Adjacent the end of the triangular end portion flange 38, is a cable-tie slot 5 extending partly across the width of the end portion 33. Adjacent the slot 5, on the upper surface of the end portion 33 is a half-cylinder shaped nodule 30. The half-cylinder shaped nodule 30 allows a cable-tie to be used anywhere along the axis of the nodule. However, the half-cylinder shaped nodule is not suitable where cables need to be secured to the bracket in a different direction in relation to the bracket. I.e. the half-cylinder nodule only allows cables to be secured to a bracket in one direction. They cannot be used to secure cables to brackets in a choice of different transverse directions.

In use, the flat bonding faces 2 of the brackets 1 are attached to the surface of a stringer 3 or rib 9 of the fuel tank of an aircraft, using adhesive or screws or rivets. Once all the relevant brackets 1 are attached, the cable 6 is placed adjacent the bracket, underneath the end portion 33. A cable-tie (not shown) is then looped around the cable 6, end portion 33 and nodule 30, and tightened to a set torque by a torque gun so as to secure the cable to the underside of the end portion 33.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The nodule on the bracket need not be in contact with the cable-tie all the way round its periphery. For example, the cable-tie could just be supported by the nodule on the middle of the nodule. The nodules could be thinner and taller.

The bracket may additionally include one or more locating bumps to guide the cable into position on the bracket. The bumps may simply allow the cable to be placed between them. Alternatively, the cable may rest on an inner side or top surface of the bumps. In this configuration, the locating bumps form at least part of the cable abutment portion that the cable is abutted against. There may be two locating bumps located towards two adjacent corners of the cable mounting face. This would provide a guide for a cable resting on the bracket in one orientation. There may be four locating bumps located towards each of the four corners off the cable mounting face. This would provide a guide for a cable in two perpendicular orientations on the bracket.

The brackets 1 may have a shorter arm portion 12, thereby giving a shorter bracket 1 with a length of 26 mm.

In the above examples, the bracket has been attached to the fuel tank by adhesive bonding. However, the bracket could be attached to the fuel tank by different means or a combination of means, for example by riveting, welding or using screws and bolts. For example, there are two holes 37 through the bonding face 2 for attaching the bracket 1 to the fuel tank in FIG. 8.

Of course, it is also possible to attach only one or some of the brackets to the fuel tank before starting to secure the cable to the brackets on the fuel tank. Alternatively, the cable could be secured to the brackets before the brackets are attached to the fuel tank.

The bracket does not have to be used on a composite, insulated structure and instead, for example, could be used in a metallic wing box made of aluminium alloy.

The bracket does not have to be made from an insulating material, and could, for example, be made from a metallic material, such as aluminium alloy. The bracket could be made in a similar way to the nylon coated aluminium alloy brackets described in the prior art.

The bracket could also be used for different applications. In fact, the bracket could be used in any application where it is desired that a cable be attached to a surface by brackets and cable-ties, where it is important that the cable is not allowed to become loose in the cable-tie and move in relation to the brackets. For example, the brackets could be used to attach flight test cabling or to attach cable to a trailing edge of an aircraft wing.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A bracket for attaching a cable to a vehicle, the bracket comprising;
   (i) a vehicle attachment portion for attaching the bracket to a bracket attachment surface of the vehicle, and
   (ii) a cable abutment portion for securing the cable to the bracket, the cable abutment portion comprising;
      a front surface against which the cable can be secured by a cable-tie forming a closed loop around the cable and cable abutment portion, and
      a non-planar rear surface at least partially defining a path of the closed loop of the cable-tie behind the cable abutment portion, the path passing first and second regions on opposing sides of the non-planar rear surface and the non-planar rear surface directly supports the cable-tie at a third region along the path of the closed loop between the first and second regions, wherein the non-planar rear surface defines at least three points of contact for the cable-tie on the path behind the cable abutment portion, including (i) a first point of contact at the first region, (ii) a second point of contact at the second region, and (iii) a third point of contact at the third region, wherein the distance of the third point from the cable abutment portion is both greater than the distance of the first point and greater than the distance of the second point from the cable abutment portion, wherein the non-planar rear surface defines said at least three points of contact for the cable-tie on the path behind the cable abutment portion in more than one orientation behind the cable abutment portion, thereby allowing the cable to be secured to the bracket in a one of two different orientations with respect to the bracket.

2. A bracket as claimed in claim 1, wherein at least part of the non-planar rear surface is substantially in the form of a dome.

3. A bracket as claimed in claim 2, wherein the dome is a substantially hemispherical dome.

4. A bracket as claimed in claim 1, wherein the vehicle is an aircraft.

5. A bracket as claimed in claim 1, wherein the bracket is configured to attach to a fuel tank of the vehicle.

6. A bracket as claimed in claim 1, wherein the bracket is wholly made from an electrically insulating material.

7. An electrical assembly comprising a plurality of brackets according to claim 1 and a cable secured to each of the plurality of brackets by a cable-tie.

8. An aircraft stringer or rib with a plurality of brackets, each bracket according to claim 1.

9. A fuel tank including a plurality of brackets, each bracket according to claim 1.

10. An aircraft including a plurality of brackets, each bracket according to claim 1.

11. A method of attaching a cable to a vehicle comprising the following steps;
    i) providing a bracket according to claim 1,
    ii) attaching the vehicle attachment portion of the bracket to the vehicle,
    iii) placing the cable near the front surface of the cable abutment portion of the bracket, and
    iv) tightening a cable-tie around the cable and the cable abutment portion of said bracket so as to secure the cable against the cable abutment portion of the bracket.

12. A method according to claim 11, wherein, when the cable-tie is tightened, the cable-tie forms a closed loop and is held in direct contact against the third region of the non-planar rear surface of said bracket.

13. A bracket as claimed in claim 1, wherein the cable can be secured to the bracket in one of two transverse directions.

14. A bracket for attaching a cable to a vehicle, the bracket comprising;
    (i) a vehicle attachment portion for attaching the bracket to a bracket attachment surface of the vehicle, and
    (ii) a cable abutment portion for securing the cable to the bracket, the cable abutment portion comprising;
       a front surface against which the cable can be secured by a cable-tie forming a closed loop around the cable and cable abutment portion, and
       a non-planar rear surface at least partially defining a path of the closed loop of the cable-tie behind the cable abutment portion, the path passing first and second regions on opposing sides of the non-planar rear surface and the non-planar rear surface directly supports the cable-tie at a third region along the path of the closed loop between the first and second regions, wherein the front of the cable abutment portion is offset in a direction parallel to the bracket attachment surface of the vehicle, away from the vehicle attachment portion.

15. A bracket as claimed in claim 14, wherein the vehicle is an aircraft.

16. A bracket as claimed in claim 14, wherein the bracket is configured to attach to a fuel tank of the vehicle.

17. A bracket as claimed in claim 14, wherein the bracket is wholly made from an electrically insulating material.

18. An electrical assembly comprising a plurality of brackets according to claim 14 and a cable secured to each of the plurality of brackets by a cable-tie.

19. An aircraft stringer or rib with a plurality of brackets, each bracket according to claim 14.

20. A fuel tank including a plurality of brackets, each bracket according to claim 14.

21. An aircraft including a plurality of brackets, each bracket according to claim 14.

22. A method of attaching a cable to a vehicle comprising the following steps;

v) providing a bracket according to claim 14, vi) attaching the vehicle attachment portion of the bracket to the vehicle, vii) placing the cable near the front surface of the cable abutment portion of the bracket, and viii) tightening a cable-tie around the cable and the cable abutment portion of said bracket so as to secure the cable against the cable abutment portion of the bracket.

23. A method according to claim 22, wherein, when the cable-tie is tightened, the cable-tie forms a closed loop and is held in direct contact against the third region of the non-planar rear surface of said bracket.

24. A bracket as claimed in claim 14, wherein the non-planar rear surface defines at least three points of contact for the cable-tie on the path behind the cable abutment portion, including (i) a first point of contact at the first region, (ii) a second point of contact at the second region, and (iii) a third point of contact at the third region, wherein the distance of the third point from the cable abutment portion is both greater than the distance of the first point and greater than the distance of the second point from the cable abutment portion, wherein at least part of the non-planar rear surface has the shape of a cylinder which presents a curved convex profile, thereby defining a substantially curved path in one direction behind the cable abutment portion.

* * * * *